(12) United States Patent
Amini et al.

(10) Patent No.: US 9,900,826 B2
(45) Date of Patent: Feb. 20, 2018

(54) BEACON PROTECTION IN A WIRELESS NETWORK

(71) Applicant: NetGear, Inc., San Jose, CA (US)

(72) Inventors: Peiman Amini, Mountain View, CA (US); Joseph Amalan Arul Emmanuel, Cupertino, CA (US); Steven Skeoch, San Jose, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

(21) Appl. No.: 14/688,981

(22) Filed: Apr. 16, 2015

(65) Prior Publication Data
US 2016/0309393 A1  Oct. 20, 2016

(51) Int. Cl.
*H04B 1/38* (2015.01)
*H04W 40/24* (2009.01)
*H04W 48/12* (2009.01)
H04W 88/02 (2009.01)
H04W 88/08 (2009.01)

(52) U.S. Cl.
CPC ......... *H04W 40/244* (2013.01); *H04W 48/12* (2013.01); *H04W 88/02* (2013.01); *H04W 88/08* (2013.01)

(58) Field of Classification Search
CPC . H04W 84/12; H04W 52/0216; H04W 16/14; H04W 74/0816; H04W 88/08; H04W 28/0289; H04W 28/26; H04W 36/06; H04W 40/244; H04W 4/08; H04W 52/0235; H04W 52/0238; H04W 52/0241; H04W 52/0245; H04W 52/0274; H04W 52/16
See application file for complete search history.

(56) References Cited

U.S. PATENT DOCUMENTS

| | | | | |
|---|---|---|---|---|
| 2009/0147768 A1* | 6/2009 | Ji | ........................ | H04J 3/0664 370/350 |
| 2010/0284316 A1* | 11/2010 | Sampathkumar | . | H04W 52/0216 370/311 |
| 2011/0299509 A1* | 12/2011 | Wang | ................... | H04W 16/14 370/336 |
| 2014/0112222 A1* | 4/2014 | Park | ...................... | H04W 4/08 370/311 |
| 2014/0119277 A1* | 5/2014 | Athankutty | ........... | H04W 88/06 370/328 |
| 2014/0140208 A1* | 5/2014 | Cherian | .............. | H04W 56/002 370/230 |

(Continued)

OTHER PUBLICATIONS

IEEE Standard 802.11™—2012, IEEE, Mar. 29, 2012, pp. 417-423, 428.

*Primary Examiner* — Golam Sorowar
(74) *Attorney, Agent, or Firm* — Perkins Coie LLP

(57) ABSTRACT

A wireless station implements a technique to reduce the occurrence of collisions between messages in a wireless network by dynamically modify a message interval during a communication session, based on received information indicative of beacon timing. The technique can be implemented by an access point on a wireless local area network to reduce collisions of beacon transmissions. The received information can include information indicative of beacon timing of other wireless stations, difficulty of a wireless station in receiving beacon transmissions, device capabilities, and/or other information.

35 Claims, 7 Drawing Sheets

(56) References Cited

U.S. PATENT DOCUMENTS

2016/0088567 A1*  3/2016  HomChaudhuri  H04W 52/0274
                                        370/252
2016/0174016 A1*  6/2016  Moon ................... H04W 4/005
                                        370/329
2016/0234807 A1*  8/2016  Levy ..................... H04W 56/00

* cited by examiner

BEACON PROTECTION IN A WIRELESS NETWORK

FIELD OF THE INVENTION

At least one embodiment of the present invention pertains to wireless communications, and more particularly, to avoidance of beacon collisions in a wireless network.

BACKGROUND

The Institute of Electrical and Electronics Engineers (IEEE) standard 802.11 is perhaps the most commonly implemented communications standard today in the context of wireless local area networks (WLANs). Various versions of and amendments to this standard have been published to date, including 802.11a, 802.11b, 802.11g, 802.11n, 802.11-2012, 802.1ac, 802.1ad, 802.1ah, etc. (collectively and individually "IEEE 802.11" or simply "802.11").

Under 802.11, an access point (AP) transmits various management messages, called "frames," to other wireless stations. One type of management frame is called a beacon frame, or simply "beacon." Beacons are sent periodically by an AP to synchronize a wireless network. A beacon contains key information about the network, including a timestamp, the beacon interval, capability Information, service set identifier (SSID), supported rates, etc. The beacon identifies the presence of an AP, and clients and APs can maintain timing synchronization by using the time stamp in the beacon.

When a wireless station receives a beacon from another wireless station, its radio interface determines the received signal strength of the beacon, along with capability information and information regarding the network. In a network environment that includes multiple APs, a non-AP wireless station uses a received signal strength indicator (RSSI) and capability information to rank APs and decide which APs to attempt to use. An AP can use other APs' beacons to determine how many other APs are within communications range and which channels they use. An AP can also take into account other APs' information to select certain parameters, such as its channel of operation.

The beacon in 802.11 also supports use of power-saving mode by low-power clients, including battery operated devices. With infrastructure networks, an AP will buffer frames destined for sleeping stations and announce which clients have frames queued for them by use of a traffic indication map (TIM).

Under current implementations of 802.11, APs generally transmit beacons at intervals of approximately 100 ms or 200 ms. No channel reservation is done for purposes of sending beacons. Instead, 802.11 mandates use of a Carrier Sense Multiple Access/Collision Avoidance (CSMA/CA) algorithm for purposes of sending beacons and other messages. If another station is sending a frame when a beacon is to be sent, then the AP should detect this condition and "back off", i.e., wait until the other station is done transmitting. Consequently, the actual time between two consecutive beacons may be longer than the beacon interval. CSMA/CA does not always work perfectly, however, and when it does not, beacons may collide with (i.e., temporally overlap) messages transmitted by other stations (including beacons of other APs). Additionally, the crystal oscillator used to derive the clock in an AP typically has some frequency drift, which can affect the timing of beacon transmissions and thereby contribute to beacon collisions with other messages.

Beacon collisions can have a significant impact on performance and power consumption and are therefore undesirable. When beacons from two APs collide, new clients may not be able to detect one or both of the APs. Further, clients that are already associated to an AP and are in the active state may not be able to synchronize themselves to the AP. Additionally, a client in power saving mode may have extra delays in receiving packets, may have to stay awake longer (e.g., to receive the beacon), and may even become disconnected from the AP and have to reconnect. Extra activity on the client side due to beacon collisions also consumes excess power on the client, which can be a significant issue for battery-operated (e.g., mobile) clients.

In addition to CSMA/CA and frequency drift, there are other known causes for beacon collisions, such as the so-called "hidden node" problem. Some APs may not be within wireless range of each other, yet there are clients that can detect the presence of both APs. As a result, the CSMA/CA back-off procedure employed by a given AP may not work in this situation. Additionally, some APs may be within range of each other but still may not detect another AP's beacon, due to fading or receiver failure, for example. Further, some APs have poor physical layer or MAC implementations, and therefore, they may transmit beacons and other packets when they should not.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
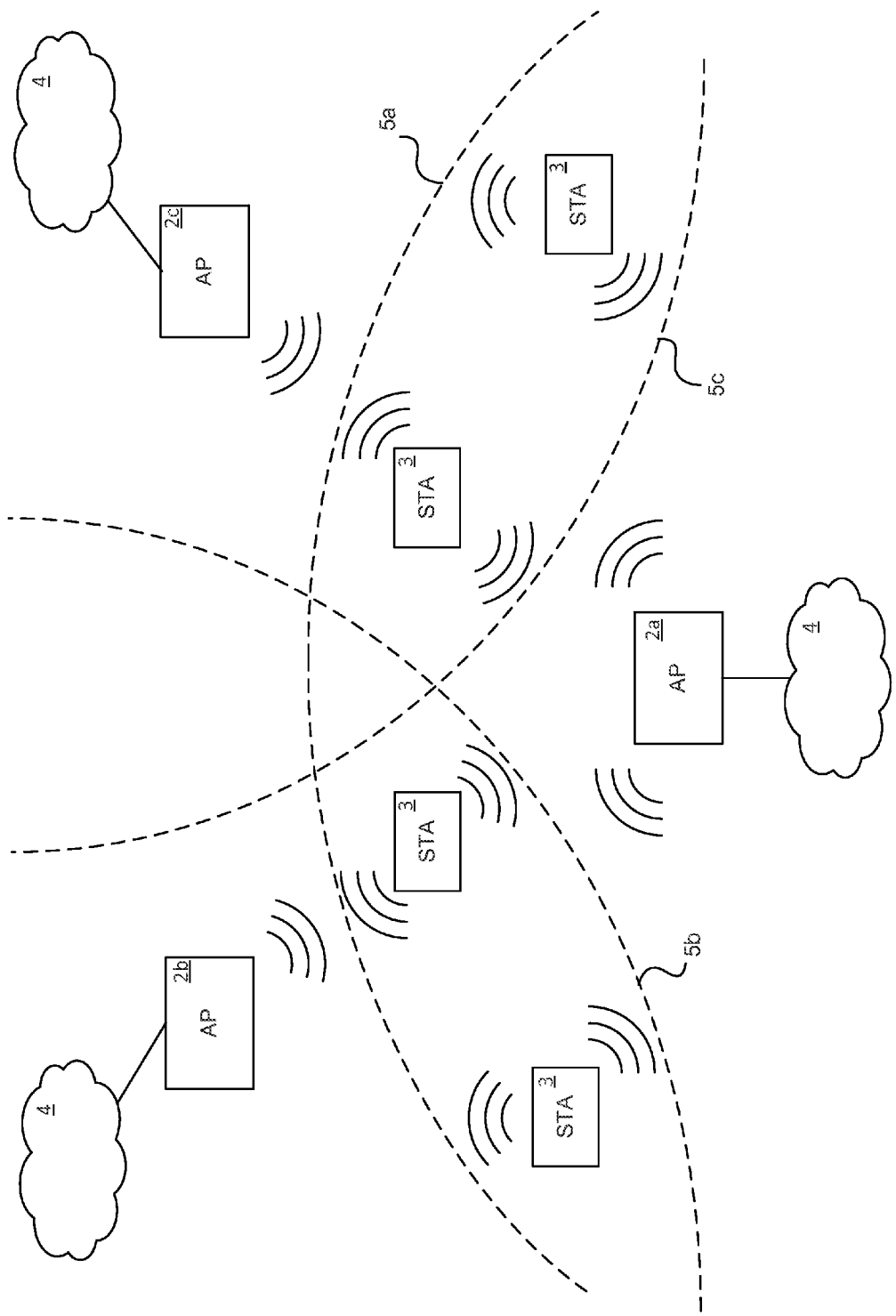
FIG. 1 illustrates an example of an environment in which a beacon protection technique can be implemented.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here are techniques for reducing collisions between messages in a wireless network, such as beacon collisions, by, for example, enabling a wireless access point to dynamically modify its beacon interval during a communication session, based on current network conditions. The disclosed techniques are particularly, though not exclusively, applicable to and advantageous for reducing beacon collisions in an IEEE 802.11 compliant network. Note, however, that while the disclosed techniques are described in the context of IEEE 802.11 to facilitate explanation, it is not limited in applicability to beacon messages or to IEEE 802.11 based communications. It is contemplated that the techniques introduced here can be applied advantageously to other types of communication networks and protocols. Such other types of communication networks and protocols may include, for example, Ethernet, Bluetooth, Bluetooth Low Energy (BLE), IEEE 802.16 (WiMax), or a cellular telecommunications standard such as 3GPP Long-Term Evolution (LTE) or LTE-Advanced (LTE-A), and various other technologies.

Note also that in this description, the term "IEEE 802.11" or "802.11" is intended to encompass any and all existing and/or future amendments/versions of IEEE standard 802.11, unless otherwise stated or physically impossible. Additionally, in this description the terms "client" and "non-AP station" are generally used interchangeably, even though in certain instances an AP may function as a client.

Under IEEE 802.11, a parameter called Target Beacon Transmission Time (TBTT) is the time at which a node (i.e., an AP, or a non-AP station in ad-hoc mode) must send a beacon. The time difference between two consecutive TBTTs is known as the beacon interval. The beacon interval is given in Time Units (TU), where each TU represents 1,024 microseconds. The beacon interval is typically set to 100 TUs (102,400 microseconds, or 102.4 ms) and its length is two bytes.

In a technique introduced here, an 802.11 compliant AP can decide to modify its beacon interval during a communication session, based on information indicative of beacon timing that it acquires from one or more other wireless stations. The beacon interval can be modified according to, for example, a randomization criterion or a predetermined numerical sequence, to reduce the possibility of beacon collisions. The acquired information upon which the AP bases its decision to modify the beacon interval can include actual detected beacons of one or more other APs, information from non-AP stations indicative of other APs' beacons, or other types of information, such as client type or capabilities information, an indication that another wireless station is having difficulty receiving beacons, etc. When an AP modifies its beacon interval in this manner, the new beacon interval can be communicated to associated stations in the existing beacon interval field according to current versions of 802.11, or in a modified (e.g., extended) beacon interval field such as described below.

FIG. 1 shows an example of an environment in which the beacon protection techniques introduced here can be applied. The illustrated environment includes multiple APs 2a, 2b and 2c (collectively APs 2) and multiple non-AP stations (or "STAs") 3, all operating in compliance with IEEE 802.11. At least one of the APs 2 may be connected to a wired network 4, such as the Internet, as shown. In the illustrated environment, each non-AP station 3 is within a wireless communications range 5a, 5b or 5c of each AP 2a, 2b or 2c, respectively, and therefore each non-AP station 3 can detect and receive messages from all of the illustrated APs 3. However, none of the APs 2 is within range of, or can detect or receive messages from, any other AP. This example therefore illustrates the "hidden node" scenario. Dynamic modification of beacon interval can be used in a scenario to avoid beacon collisions. For example, one or more of the APs 2 each may receive an indication from one or more non-AP stations 3 that the non-AP station is having difficulty receiving the AP's beacon, which may be interpreted as an indication of beacon collisions. An AP 3 can then modify its own beacon interval to avoid beacon collisions.

In a technique introduced here, different APs may choose different beacon intervals, such that consecutive beacons do not have same target beacon transmission time. The beacon interval may be chosen such that it is some predetermined number of microseconds different from the other known AP beacon intervals being used. Alternatively, the beacon interval can be randomized between specified acceptable values, or simply randomized within some specified range of values.

An AP can change its beacon interval over time if, for example, it receives beacons from other APs with beacon interval close to its own beacon interval. Beacons alternatively can be transmitted by an AP in some other pattern, such as at different intervals over time where the interval values follow a known or predetermined sequence of numbers. The sequence of numbers can be communicated to non-AP stations using an existing or modified beacon interval field such as described below.

In certain embodiments, beacons are transmitted periodically but at different intervals for different APs. An AP can scan the operating channel to determine which beacon intervals are being used, and can avoid using any beacon interval that is less some minimum number of microseconds different from the beacon intervals already being used. Additionally, an AP can delegate to non-AP stations the task of scanning the channel and reporting back to the AP beacon intervals that are used, as described further below to avoid hidden node issues.

It is possible to choose the beacon interval from a wide variety of values. Note, however, that increasing the beacon interval may cause delay in the association and roaming process, because stations scanning for available APs may miss the beacons. On the other hand, it may reduce the overall number of beacons and associated overhead in a given period of time. Conversely, decreasing the beacon interval may result in the quickest association and roaming process, but there will likely be additional overhead.

Figure 2:
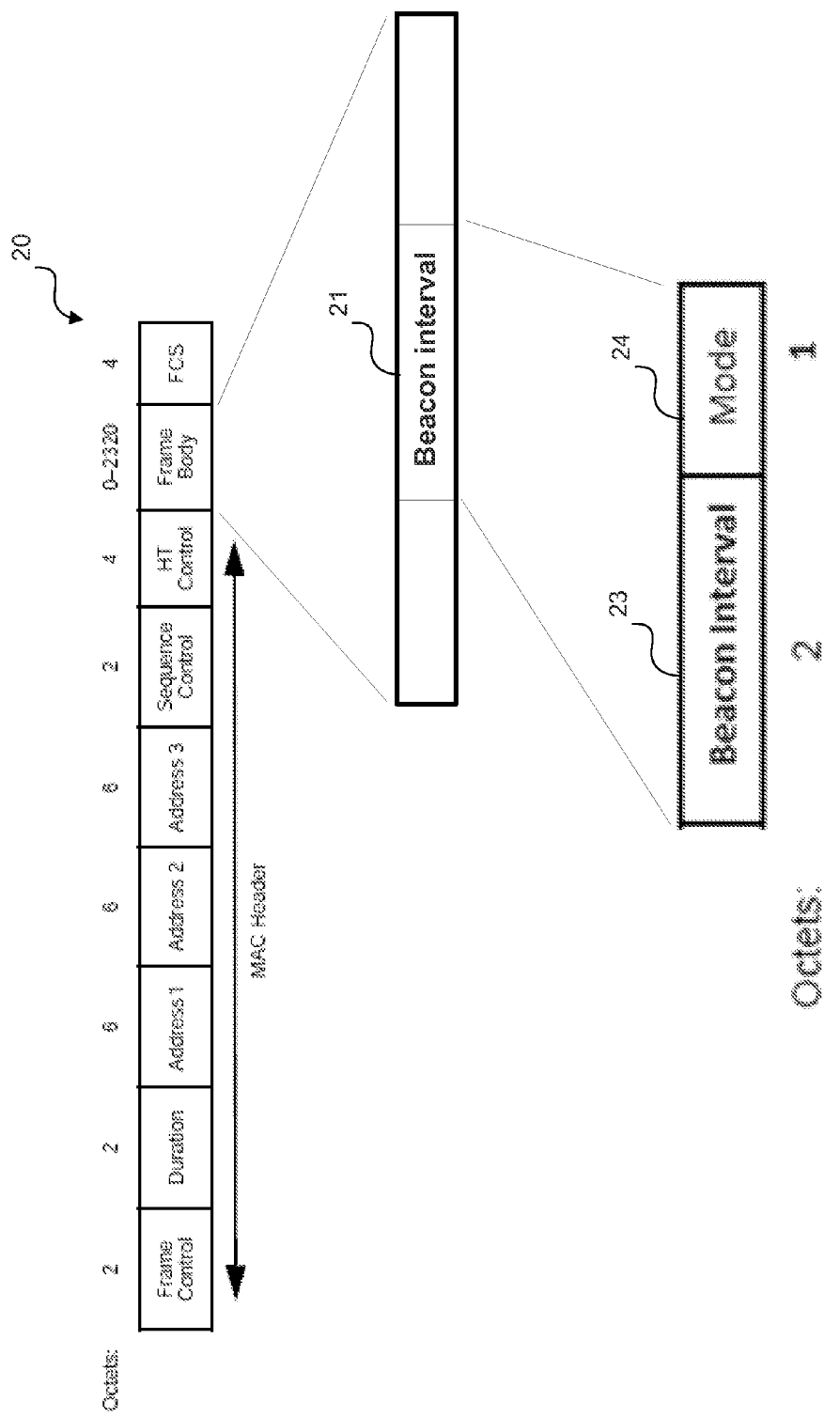
FIG. 2 illustrates an example of a beacon frame including a modified beacon interval field.

Under 802.11, a beacon frame is a type of management frame. FIG. 2 illustrates the general format of a management frame 20, of which a beacon frame is one type. As shown, a management frame includes a multi-field MAC header, a frame body, and a frame check sequence (FCS). The information that is unique to each type management frame (e.g., a beacon frame) is contained within the frame body. In a beacon frame, the frame body includes a timestamp field, beacon interval field, capability field, SSID field, supported rates field, etc. The beacon interval field 21 may be two octets in length, for example.

As noted above, the modified beacon interval can be communicated to other stations in the standard beacon interval field as defined under current versions of 802.11, or in a modified beacon interval field. In some embodiments, the standard 802.11 beacon interval field is replaced by an extended beacon interval field 21, which includes the standard beacon interval field 23 already available under (for example) 802.11-2012 and a beacon interval extension field 24. The already available beacon interval field 23 together with the beacon interval extension field 24 are collectively referred to herein as the new, modified or extended beacon interval field 21. The new beacon interval field 21 can be used to provide backward compatibility to accommodate stations that do not have the ability to dynamically modify the beacon interval or to receive a dynamically modified beacon interval.

Alternatively, in some embodiments the already available beacon interval field 23 is modified to convey the beacon transmission patterns that are not using the same beacon interval. For example, a predetermined beacon interval number (e.g., a very large number that is unlikely to be used) may be used to communicate a predefined beacon transmission pattern that does not use the same beacon interval for all beacons. One extra octet, e.g., a mode field, for example, may be added to describe the beacon transmission pattern, as shown in FIG. 2. Additional octets may be added to show different patterns or different periods, if necessary.

In some embodiments, an AP may decide what beacon pattern or beacon interval to use based on the type(s) of clients that are associated to the AP and/or the capabilities of such clients. One such criterion may be, for example, whether a non-AP station has the capability to detect and adjust to a modified beacon interval. A non-AP station with such capability can notify an AP of that capability by using a probe request, association request or other management frame or control frame.

As another example, a non-AP station can notify an AP as to what level of power requirement it has, where different levels of power requirement can be defined, which notification may be used to tell the AP how important it is for the client to be able to receive beacons on time and to track beacons without issues. The AP can then use this information to decide whether to modify its beacon interval. The power requirement can be communicated to the AP during association, or after the association if the power requirement changes over time. If there are legacy clients near an AP that do not support the new beacon patterns, in order to maintain backward compatibility the AP may use a regular interval for all clients, or it may transmit beacons in the regular interval and in a modified interval.

An AP can modify its beacon interval dynamically (i.e., during a communication session) multiple times, if for example current network conditions make it necessary or desirable to do so. An AP may adjust its beacon interval after it has booted up and has started its beacon for various reasons, such as if it is receiving beacons from neighboring APs with the same or very similar beacon interval as its own. Other reasons for dynamic adjustment of the beacon interval might include, for example: the AP detecting multiple delays in transmitting its beacon due to backing off to another AP's beacon; receiving a report from a client that there is another AP in proximity the client (or other clients) with the same or similar value of beacon interval; or receiving a report from one or more clients indicating that they are having difficulty receiving multiple beacons from one or more APs.

Any of various procedures can be employed by an AP to modify its beacon interval. In one embodiment, the AP scans for beacon timing information and collects beacon timing information from associated clients and, in some cases, from neighboring APs. The AP then selects the best beacon interval that is sufficiently different from the beacon intervals of any other nearby APs. An algorithm may be employed to select the new beacon interval, which may be based on a randomization criterion and/or a predefined numerical sequence.

Once beacon interval selection is complete, the AP communicates to associated clients that it intends to change the beacon interval and when it intends to do so, by using any of various different methods. For example, the beacon itself can be used to indicate the time at which the beacon interval will change. Alternatively, an action frame (e.g., as defined in 802.11) may be used to indicate the time at which the beacon interval will change. As another alternative the time of change of beacon interval may be communicated using other types of frames, such as other data, control, or management frames.

Figure 3:
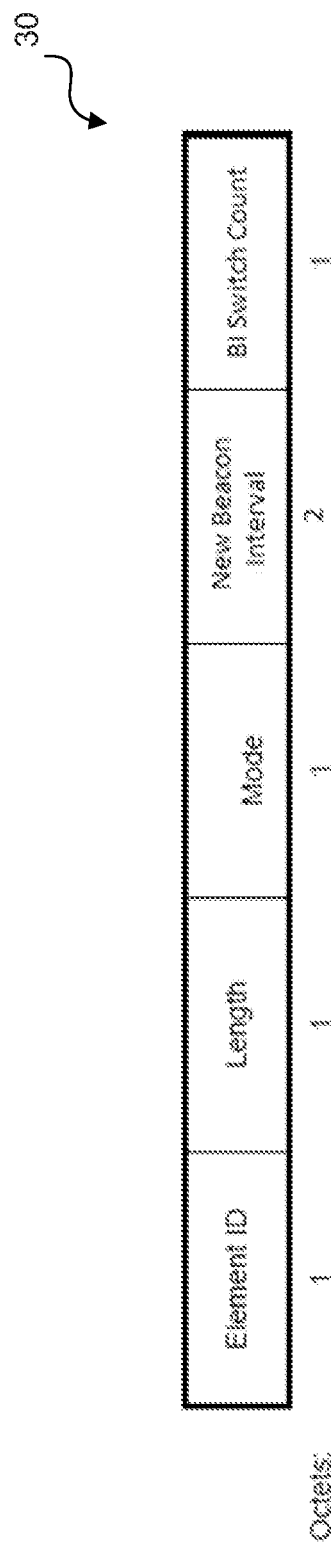
FIG. 3 illustrates an example of an information element for communicating a change in beacon period.

An information element may be used to communicate the time at which a change of beacon period will occur. FIG. 3 illustrates an example of such an information element. The information element 30 contains an Element Identifier (ID) field, Length field, Mode field, New Beacon Interval field, and Beacon Interval (BI) Switch Count field. The New Beacon Interval field can be set to the number interval, e.g., a countdown (in terms of the number of beacons) until the beacon interval changes. The Mode field specifies the new beacon interval pattern or any other optional information that needs to be communicated. The BI Switch Count field either is set to the number of beacons until the station sending the BI switch announcement element switches to the new channel or is set to 0. In some embodiments, a value of 1 for BI Switch Count indicates that the switch of beacon interval occurs immediately before the next beacon, whereas a value of 0 indicates that the switch occurs at any time after the frame containing the element is transmitted. In some embodiments, at the request of the AP whose beacon interval is being modified, a non-AP station may broadcast or forward a BI switch announcement on behalf of that AP.

Figure 4A:
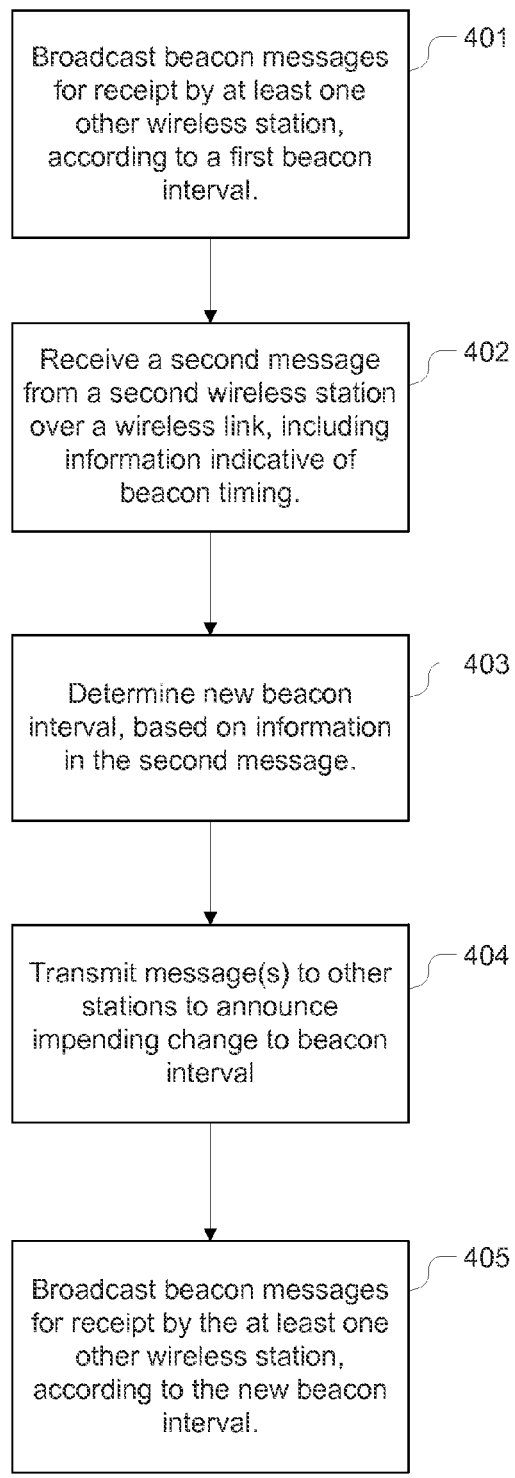
FIG. 4A is a flow diagram showing an example of a process of modifying a beacon interval.

FIG. 4A illustrates a process that can be employed by an AP to reduce the likelihood of beacon collisions. Initially, at step 401 the AP broadcasts beacon messages wirelessly for receipt by at least one other wireless station, according to a first beacon interval. The other wireless station(s) can include one or more APs and/or non-AP stations. Next, at step 402, the AP receives a second message from one of the other wireless stations (a "second wireless station") over a wireless link, including information indicative (directly or indirectly) of beacon timing. The information in the second message may have been requested by the AP, or it may be received by the AP not based on any prior request. The second wireless station may be another AP or a non-AP station. If the second wireless station is another AP, the second message may be a beacon of the other AP, in which case the second message is directly indicative of beacon timing; or it may be another type of message bearing information indicative of beacon timing. The second message alternatively can be from a non-AP station and include information on beacon timing (e.g., beacon interval) of another AP that may be out of range of the first AP. Alternatively, the second message can be, for example, a message from a non-AP station indicating that the non-AP station is having difficulty detecting beacons, in which case the second message is only indirectly indicative of beacon timing.

At step 403, the AP then determines a new beacon interval that is different from its original beacon interval (the "first beacon interval"), based on information in the second message, and using the appropriate algorithm. As noted above, the algorithm may be based on a randomization criterion and/or a predetermined set of values. The AP then transmits, at step 404, one or more message(s) to other stations to announce the impending change to its beacon interval. The announcement indicates what the new beacon interval will be and when it will begin. The announcement may be transmitted by broadcast, multicast or unicast, depending on client capabilities, for example. At step 405, at the designated time the AP begins broadcasting beacon messages, for receipt by the at least one other wireless station, according to the new beacon interval.

Figure 4B:
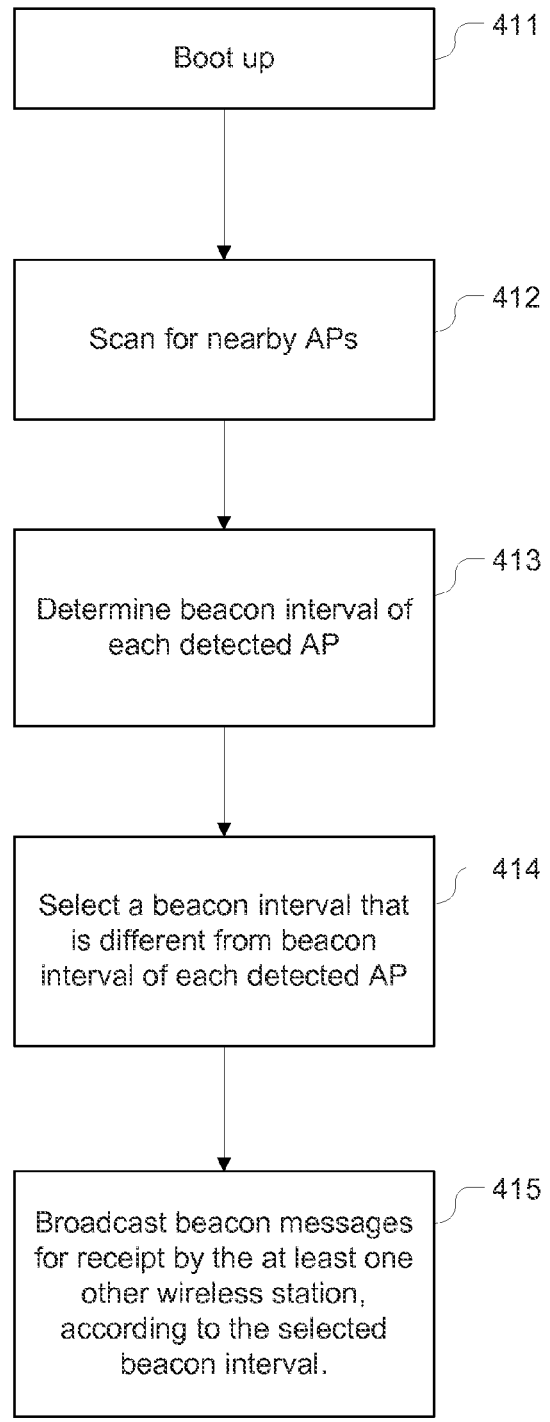
FIG. 4B is a flow diagram showing an example of a process of setting a beacon interval immediately upon boot-up, based on other detected beacons.

In some embodiments, immediately after an AP boots up, it scans for other APs nearby and picks a beacon interval or beacon pattern that is different from those of the nearby APs. FIG. 4B shows an example of a process that an AP may perform to do so. Initially upon power-on or reset, the AP boots up (initializes) at step 411. Next, at step 412, the AP scans for nearby APs, for example, by detecting their beacons. The AP then determines the beacon interval of each detected AP, from the beacon of each detected AP, at step 413. At step 414, the AP selects a beacon interval that is different from the beacon interval of each detected AP. At step 415, at the designated time the AP begins broadcasting beacon messages, for receipt by the at least one other wireless station, according to its selected beacon interval.

Various other beacon protection techniques can be employed to reduce beacon collisions, in addition to or instead of dynamically modifying the beacon interval. These techniques may be employed if, for example, an AP detects beacon collisions despite having selected or modified its beacon interval in attempt to avoid such collisions, or if it detects any condition that is suggestive of beacon collisions or beacon delays. For example, a beacon guard time can be added immediately before beacon transmissions. In current implementations of 802.11, downlink and uplink traffic compete with beacon transmissions, such that beacons sometimes get delayed due to downlink or uplink traffic. To ensure that there is a clear channel at a targeted beacon time, a mechanism can be employed to cause an AP and client to refrain from transmission some predetermined number of milliseconds before the TBTT for some or all beacons. A new information element can be defined, by which the AP specifies to clients at which time interval before the beacon they shall clear the channel. The new information element can be transmitted as part of a beacon, probe request, probe response, or other management or control frame.

Additionally, to force legacy clients or clients with other basic service set identifiers (BSSIDs) off the air prior to a beacon transmission, an AP or a client directed by an AP can attempt to reserve the medium some predetermined number of milliseconds before some or all beacons are supposed to be transmitted. In that situation, the AP can send a clear-to-send to self (CTS2SELF) message to clear the channel. The AP can perform a modified request send/clear to send (RTS/CTS) message exchange with a client to reserve the channel for the duration of the protected beacons.

In another approach, the CSMA/CA algorithm can be modified to provide protection for beacons. In current implementations, the beacon is transmitted following CSMA/CA according to best efforts., i.e., with low priority. As a result, beacons get delayed. Therefore, in accordance with a technique introduced here, an AP may instead use higher priority queues for beacons, such as used in the enhanced distributed channel access (EDCA) mechanism, to avoid large contention windows and decrease beacon delays. Alternatively, an AP can define a separate set of CSMA/CA back-off parameters only for beacons, or may overrule the CSMA/CA for beacons and transmit a beacon if it sees the channel is clear for some predetermined number of time slots.

Figure 5:
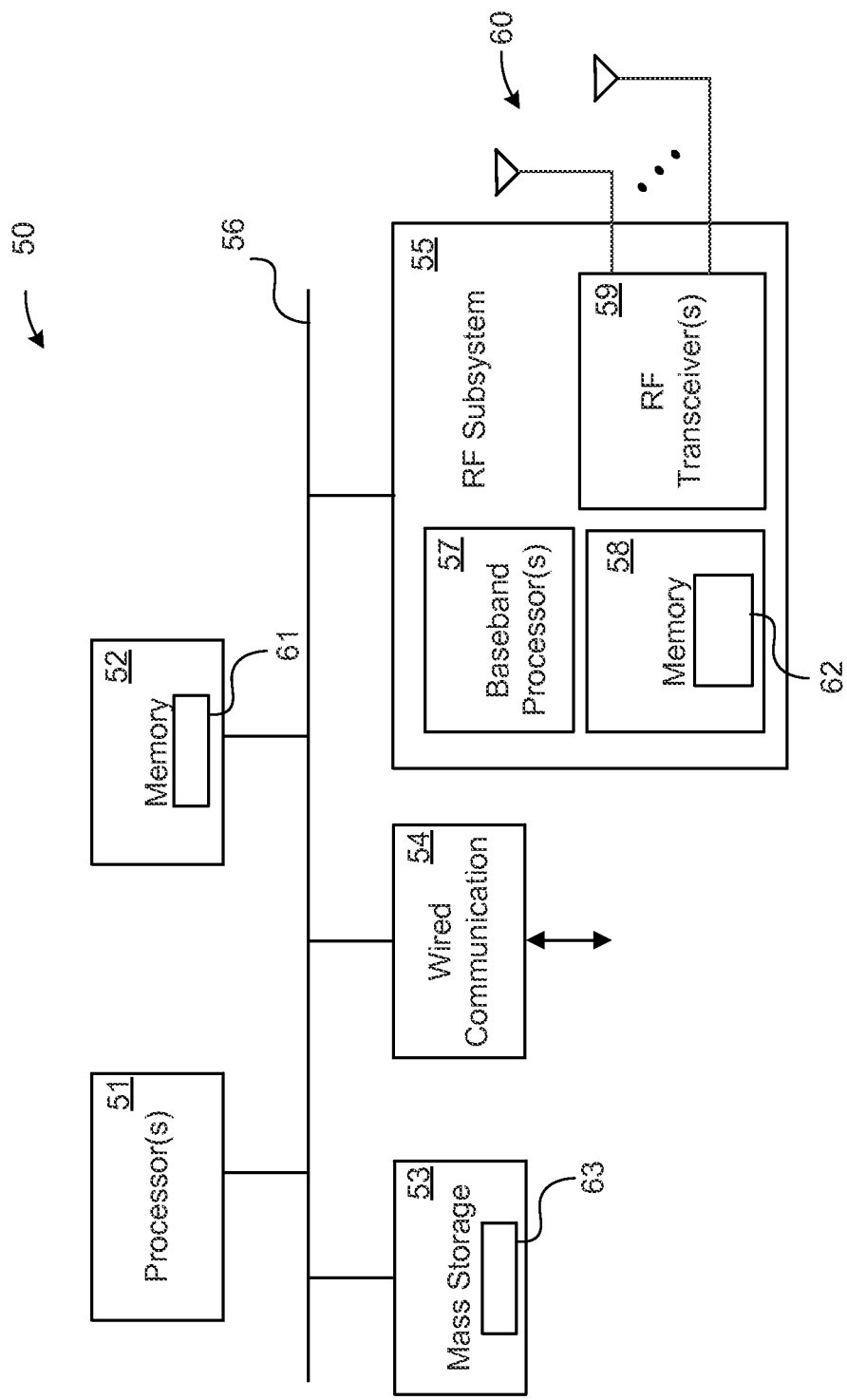
FIG. 5 is a block diagram showing an example of a hardware architecture of a wireless station that can implement the beacon protection techniques described herein.

FIG. 5 illustrates an example of a hardware architecture of a wireless station, such as an AP, that can implement any of the beacon protection techniques described above. The illustrated wireless station 50 includes one or more main processors 51, memory 52, one or more mass storage devices 53, a wired communication adapter 54, and an RF subsystem 55, all coupled to each other through an interconnect 56. The interconnect 56 may be or include one or more conductive traces, buses, point-to-point connections, controllers, adapters and/or other conventional connection devices. The main processor(s) 51 (which may include one or more multicore processors) control the overall operation of the wireless station 50 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Memory 52 can be or include one or more physical storage devices, which may be in the form of random access memory (RAM), read-only memory (ROM) (which may be erasable and programmable), flash memory, miniature hard disk drive, or other suitable type of storage device, or a combination of such devices. The mass storage device(s) 53 can be or include one or more hard drives, digital versatile disks (DVDs), flash memories, or the like. Memory 52 and/or mass storage 53 can store (individually or collectively) code 62 or 63, i.e., data and instructions, that configure the main processor(s) 51 to execute operations to implement the techniques described above. The wired communication adapter 54 may be or include, for example, an Ethernet adapter, cable modem, DSL adapter, or the like, or a combination thereof. In certain embodiments, the wireless station 50 may further include one or more I/O devices (not shown), such as a display device, audio speaker, keyboard, mouse or other pointing device, microphone, camera, etc.

The RF subsystem 55 includes one or more baseband processors 57 to process baseband signal signals, memory 58, one or more RF transceivers 59. The wireless station 50 further includes one or more antennas 60 coupled to the RF transceiver(s) 59. Memory 58 may store code (i.e., instructions and/or data) 62 that, when executed by the baseband processors 57 and/or main processors 51, causes the wireless station 50 to perform the beacon protection techniques described above. In one embodiment, the RF subsystem 55 is or includes a Wi-Fi chip configured to operate in compliance with IEEE 802.11. In other embodiments, the RF subsystem 55 may instead or additionally operate according to one or more other communication standards, such as Ethernet, Bluetooth, BLE, or a cellular telecommunications standard such as 3GPP LTE or LTE-A.

Figure 6:
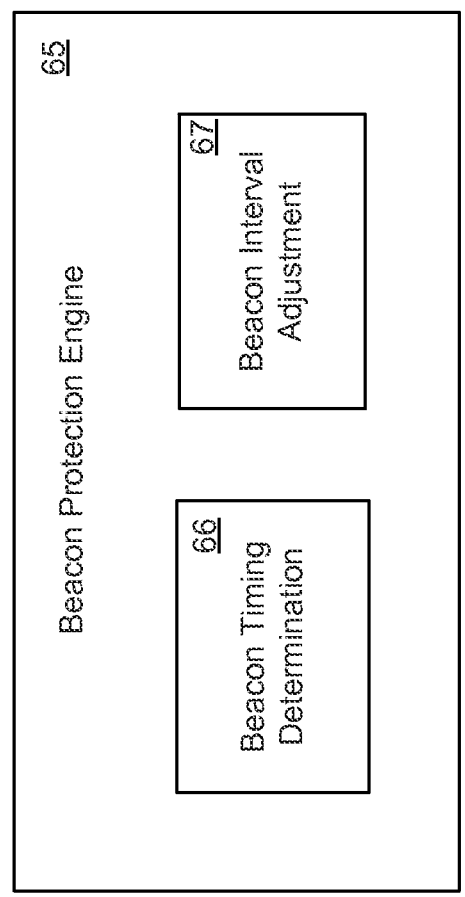
FIG. 6 illustrates a beacon protection engine that can be implemented in a wireless station.

FIG. 6 illustrates a beacon protection engine that can be implemented in a wireless station, in accordance with the techniques introduced here. As shown, the beacon protection engine 65 includes a beacon timing determination module 66 and a beacon interval adjustment module 67. The beacon timing determination module 66 is responsible for, among other things, acquiring beacon timing information from other wireless stations in the manner described above, and based on that information, determining if and when an adjustment to the wireless station's own beacon interval is appropriate. The beacon interval adjustment module 67 is responsible for, among other things, selecting a new beacon interval in the manner described above, when appropriate, and notifying other wireless stations of the new beacon interval in the manner described above. In the context of the system of FIG. 5, the beacon protection engine 65 can be implemented as the main processor(s) 51, baseband processor(s) 57, or another component or components within the wireless station 50, or its functionality may be distributed between such components. Furthermore, in various embodiments the beacon timing determination module 66 and beacon interval adjustment module 67 may be integrated into a single module; similarly, the beacon protection engine 65 may include additional modules that may perform other beacon protection techniques, and may be implemented in a distributed manner among multiple physical components. The beacon protection engine 65 can be implemented in the form of, for example, programmable circuitry (e.g., one or more programmable microprocessors) programmed to perform the techniques described above, or as special-purpose hardwired circuitry, such as one or more application-specific integrated circuits (ASICs), programmable logic devices (PLDs), field-programmable gate arrays (FPGAs), etc.; or it may be implemented as a combination of programmable and hardwired circuitry.

The machine-implemented operations described above can be implemented by programmable circuitry programmed/configured by software, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software, such as one or more programmed general-purpose microprocessors, digital signal processors (DSPs) and/or microcontrollers, system-on-a-chip systems (SOCs), or other similar device(s); or c) a combination of the forms mentioned in a) and b).

EXAMPLES OF CERTAIN EMBODIMENTS

Certain embodiments of the technology introduced herein are summarized in the following numbered examples:

1. A wireless station comprising: a radio frequency (RF) transceiver; an antenna coupled to the RF transceiver; and a processor coupled to the RF transceiver and configured to cause the wireless station to transmit beacon messages over a wireless link to at least one receiving wireless station during a communication session, according to a first beacon interval; modify the beacon interval during the communication session; and transmit beacon messages over the wireless link during the communication session, according to the modified beacon interval.

2. A wireless station as recited in example 1, wherein the wireless station is an access point (AP) as defined in IEEE standard 802.11, and the wireless link is a wireless link established in accordance with IEEE standard 802.11.

3. A wireless station as recited in example 1 or 2, wherein the processor is further configured to cause the wireless station to scan wirelessly to acquire beacon timing information, prior to dynamically modifying the beacon interval, and wherein dynamically modifying the beacon interval is based on beacon timing information acquired by the wireless station.

4. A wireless station as recited in any of examples 1 through 3, wherein the processor is configured to modify the beacon interval based on a criterion designed to reduce a likelihood that beacon messages from the first wireless station will temporally overlap beacon messages from another wireless station that is within a communications range of said at least one receiving wireless station.

5. A wireless station as recited in any of examples 1 through 4, wherein the processor is configured to modify the beacon interval based on at least one of: an indication of at least one other wireless station transmitting beacon messages in proximity to the wireless station; an indication of another beacon interval associated with beacon messages from another wireless station; an indication of a type or types of other wireless station or stations associated to the wireless station; or an indication of another wireless station having difficulty in receiving beacon messages from multiple sources.

6. A wireless station as recited in any of examples 1 through 5, wherein the processor is further configured to inform the at least one other wireless station of the modified beacon interval by generating a beacon frame that includes an extended beacon interval field containing an indication of the second beacon interval, the extended beacon interval field including a standard beacon interval field portion and an extended beacon interval field portion; and transmitting, by the wireless station, the beacon frame including the extended interval field.

7. A wireless station as recited in any of examples 1 through 6, wherein the processor is further configured to initiate a beacon protection technique in response to a beacon collision, wherein the beacon protection technique includes at least one of: imposing a guard interval immediately prior to beacon messages transmitted by the wireless station; or using a clear-to-send (CTS) protocol to clear a channel for transmission of a beacon message from the wireless station.

8. A wireless access point (AP) comprising: a plurality of antennas; and a radio frequency (RF) subsystem coupled to the plurality of antennas, the RF subsystem including an RF transceiver and a processor coupled to the RF transceiver, the processor configured to cause the wireless AP to establish an association to at least one other wireless station over a wireless link in accordance with IEEE standard 802.11, the processor further configured to cause the wireless AP to transmit beacon messages in accordance with IEEE standard 802.11, for receipt by the at least one other wireless station, according to a first beacon interval; receive a second message over the wireless link; determine a second beacon interval that is different from the first beacon interval, based on information in the second message; and transmit beacon messages in accordance with IEEE standard 802.11, for receipt by the at least one other wireless station, according to the second beacon interval.

9. A wireless AP as recited in example 8, wherein the processor is configured to determine the second beacon interval by: identifying a third beacon interval associated with beacon messages being transmitted by another wireless AP; and determining the second beacon interval based on the third beacon interval.

10. A wireless AP as recited in example 8 or 9, wherein determining the second beacon interval based on the third beacon interval comprises selecting the second beacon interval to be different from the third beacon interval.

11. A wireless AP as recited in any of examples 8 through 10, wherein the processor is configured to determine the second beacon interval based on a predetermined criterion designed to reduce a likelihood that beacon messages from the first wireless station will temporally overlap beacon messages from another wireless station that is within a communications range of said at least one receiving wireless station.

12. A wireless AP as recited in any of examples 8 through 11, wherein the processor is configured to determine the second beacon interval based on a randomization criterion.

13. A wireless AP as recited in any of examples 8 through 12, wherein the processor is configured to determine the second beacon interval by selecting the second beacon interval from among a plurality of predetermined interval values according to a randomization criterion.

14. A wireless AP as recited in any of examples 8 through 13, wherein the processor is configured to determine the second beacon interval according to a predetermined numerical sequence.

15. A wireless AP as recited in any of examples 8 through 14, wherein the second message comprises an indication of a third beacon interval associated with beacon messages from a wireless station other than the first wireless station, and wherein the processor is configured to determine the second beacon interval based on the indication.

16. A wireless AP as recited in any of examples 8 through 15, wherein the second message is a beacon message from the second wireless station.

17. A wireless AP as recited in any of examples 8 through 15, wherein the second message is not a beacon message.

18. A wireless AP as recited in any of examples 8 through 17, wherein the information in the second message comprises an indication of a presence of at least one other wireless AP, and wherein the processor is configured to determine the second beacon interval based on the indication.

19. A wireless AP as recited in any of examples 8 through 18, wherein the indication comprises an indication of a beacon interval of said at least one other wireless AP.

20. A wireless AP as recited in any of examples 8 through 19, wherein the information in the second message comprises an indication of a type or types of other wireless station or stations associated to the first wireless station, and wherein the processor is configured to determine the second beacon interval based on the indication.

21. A wireless AP as recited in any of examples 8 through 20, wherein the information in the second message comprises an indication of a capability of at least one other wireless station associated to the first wireless station, and wherein the processor is configured to determine the second beacon interval based on the indication.

22. A wireless AP as recited in any of examples 8 through 21, wherein the information in the second message comprises an indication of another wireless station having difficulty in receiving beacon messages from multiple sources, and wherein the processor is configured to determine the second beacon interval based on the indication.

23. A wireless AP as recited in any of examples 8 through 22, wherein the processor is further configured to inform the at least one other wireless station of the second beacon interval by generating a beacon frame that includes an extended beacon interval field containing an indication of the second beacon interval, the extended beacon interval field including a standard beacon interval field portion and an extended beacon interval field portion; and transmitting, by the wireless station, the beacon frame including the extended interval field.

24. A wireless AP as recited in any of examples 8 through 23, wherein the processor is further configured to cause the wireless AP to transmit a message to a second wireless station to request that the second wireless station scan for beacon messages from other wireless stations.

25. A method comprising: transmitting, by a first wireless station, beacon messages wirelessly for receipt by at least one other wireless station, according to a first beacon interval; receiving, by the first wireless station, a second message from a second wireless station over a wireless link; determining, by the first wireless station, a second beacon interval that is different from the first beacon interval, based on information in the second message; and transmitting, by the first wireless station, beacon messages for receipt by the at least one other wireless station, according to the second beacon interval.

26. A method as recited in example 25, wherein the processor is configured to determine the second beacon interval by: identifying a third beacon interval associated with beacon messages being transmitted by another wireless station; and selecting the second beacon interval to be different from the third beacon interval.

27. A method as recited in example 25 or 26, wherein said determining the second beacon interval is based on a predetermined criterion designed to reduce a likelihood that beacon messages from the first wireless station will temporally overlap beacon messages from another wireless station that is within a communications range of said at least one receiving wireless station.

28. A method as recited in any of examples 25 through 27, wherein the second message comprises an indication of a third beacon interval associated with beacon messages from a wireless station other than the first wireless station, and wherein said determining the second beacon interval is based on the indication.

29. A method as recited in any of examples 25 through 28, wherein the second message is a beacon message from the second wireless station.

30. A method as recited in any of examples 25 through 28, wherein the second message is not a beacon message.

31. A method as recited in any of examples 25 through 30, wherein the first wireless station is a wireless access point (AP), the second wireless station is a non-AP wireless station, the information in the second message comprises an indication of a presence of at least one other wireless AP, and wherein said determining the second beacon interval is based on the indication.

32. A method as recited in any of examples 25 through 31, wherein the indication comprises an indication of a beacon interval of said at least one other wireless AP.

33. A method as recited in any of examples 25 through 32, wherein the information in the second message comprises at least one of: an indication of a type or types of other wireless station or stations associated to the first wireless station; an indication of a capability of at least one other wireless station associated to the first wireless station; or an indication of another wireless station having difficulty in receiving beacon messages from multiple sources; and wherein said determining the second beacon interval is based on the indication 34. A method as recited in any of examples 25 through 33, further comprising informing the at least one other wireless station of the second beacon interval by generating a beacon frame that includes an extended beacon interval field containing an indication of the second beacon interval, the extended beacon interval field including a standard beacon interval field portion and an extended beacon interval field portion; and transmitting, by the wireless station, the beacon frame including the extended interval field.

35. A method of operating a first wireless station, the method comprising: in response to an initialization of the first wireless station, scanning a signal environment of the first wireless station to detect one or more other wireless stations that transmit beacon messages, determining a beacon interval of beacon messages transmitted by each of the one or more other wireless stations that transmit beacon messages, and selecting a beacon interval for beacon messages to be transmitted from the first wireless station, based on a result of said determining; and transmitting beacon messages from the first wireless station according to the selected beacon interval.

36. A method as recited in example 35, wherein selecting the beacon interval for beacon messages to be transmitted from the first wireless station comprises selecting the beacon interval to be different from the beacon interval of each of the one or more other wireless stations.

37. A first wireless station comprising: means for transmitting beacon messages wirelessly for receipt by at least one other wireless station, according to a first beacon interval; means for receiving a second message from a second wireless station over a wireless link; means for determining a second beacon interval that is different from the first beacon interval, based on information in the second message; and means for transmitting beacon messages for receipt by the at least one other wireless station, according to the second beacon interval.

38. A first wireless station as recited in example 37, wherein the processor is configured to determine the second beacon interval by: identifying a third beacon interval associated with beacon messages being transmitted by another wireless station; and selecting the second beacon interval to be different from the third beacon interval.

39. A first wireless station as recited in example 37 or 38, wherein said determining the second beacon interval is based on a predetermined criterion designed to reduce a likelihood that beacon messages from the first wireless station will temporally overlap beacon messages from another wireless station that is within a communications range of said at least one receiving wireless station.

40. A first wireless station as recited in any of examples 37 through 39, wherein the second message comprises an indication of a third beacon interval associated with beacon messages from a wireless station other than the first wireless station, and wherein said determining the second beacon interval is based on the indication.

41. A first wireless station as recited in any of examples 37 through 40, wherein the second message is a beacon message from the second wireless station.

42. A first wireless station as recited in any of examples 37 through 40, wherein the second message is not a beacon message.

43. A first wireless station as recited in any of examples 37 through 42, wherein the first wireless station is a wireless access point (AP), the second wireless station is a non-AP wireless station, the information in the second message comprises an indication of a presence of at least one other wireless AP, and wherein said determining the second beacon interval is based on the indication.

44. A first wireless station as recited in any of examples 37 through 43, wherein the indication comprises an indication of a beacon interval of said at least one other wireless AP.

45. A first wireless station as recited in any of examples 37 through 44, wherein the information in the second message comprises at least one of: an indication of a type or types of other wireless station or stations associated to the first wireless station; an indication of a capability of at least one other wireless station associated to the first wireless station; or an indication of another wireless station having difficulty in receiving beacon messages from multiple sources; and wherein said determining the second beacon interval is based on the indication 46. A first wireless station as recited in any of examples 37 through 45, further comprising informing the at least one other wireless station of the second beacon interval by generating a beacon frame that includes an extended beacon interval field containing an indication of the second beacon interval, the extended beacon interval field including a standard beacon interval field portion and an extended beacon interval field portion; and transmitting, by the wireless station, the beacon frame including the extended interval field.

47. A first wireless station, the method comprising: means for responding to an initialization of the first wireless station by scanning a signal environment of the first wireless station to detect one or more other wireless stations that transmit beacon messages, determining a beacon interval of beacon messages transmitted by each of the one or more other wireless stations that transmit beacon messages, and selecting a beacon interval for beacon messages to be transmitted from the first wireless station, based on a result of said determining; and means for transmitting beacon messages from the first wireless station according to the selected beacon interval.

48. A first wireless station as recited in example 47, wherein selecting the beacon interval for beacon messages to be transmitted from the first wireless station comprises selecting the beacon interval to be different from the beacon interval of each of the one or more other wireless stations.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A first wireless station comprising:
a radio frequency (RF) transceiver;
an antenna coupled to the RF transceiver; and
a processor coupled to the RF transceiver and configured to cause the first wireless station to:
transmit beacon messages over a wireless link to at least one receiving wireless station during a communication session, according to a beacon interval;
modify the beacon interval during the communication session by selecting a new beacon interval from among a plurality of predetermined interval values according to a randomization criterion;
transmit beacon messages over the wireless link during the communication session, according to the new beacon interval; and perform at least one of:
apply a particular one or more carrier sense multiple access with collision detection (CSMA/CD) backoff parameters only to beacon messages, for purposes of transmitting beacon messages from the first wireless station; or
overrule CSMA/CD for purposes of transmitting beacon messages from the first wireless station.

2. A first wireless station as recited in claim 1, wherein the first wireless station is an access point (AP) as defined in IEEE standard 802.11, and the wireless link is a wireless link established in accordance with IEEE standard 802.11.

3. A first wireless station as recited in claim 1, wherein the processor is further configured to cause the first wireless station to scan wirelessly to acquire beacon timing information, prior to dynamically modifying the beacon interval, and wherein dynamically modifying the beacon interval is based on beacon timing information acquired by the first wireless station.

4. A first wireless station as recited in claim 1, wherein the processor is configured to modify the beacon interval based on a criterion designed to reduce a likelihood that beacon messages from the first wireless station will temporally overlap beacon messages from another receiving wireless station that is within a communications range of said at least one receiving wireless station.

5. A first wireless station as recited in claim 4, wherein the processor is configured to modify the beacon interval based on at least one of:
an indication of at least one receiving wireless station transmitting beacon messages in proximity to the first wireless station;
an indication of another beacon interval associated with beacon messages from another receiving wireless station;
an indication of a type or types of receiving wireless station or stations associated to the first wireless station; or
an indication of another receiving wireless station having difficulty in receiving beacon messages from multiple sources.

6. A first wireless station as recited in claim 1, wherein the processor is further configured to inform the at least one receiving wireless station of the new beacon interval by:
generating a beacon frame that includes an extended beacon interval field containing an indication of the second beacon interval, the extended beacon interval field including a standard beacon interval field portion and an extended beacon interval field portion; and
transmitting, by the first wireless station, the beacon frame including the extended interval field.

7. A wireless station as recited in claim 1, wherein beacon protection technique further includes:
using a clear-to-send (CTS) protocol to clear a channel for transmission of a beacon message from the first wireless station.

8. A first wireless station as recited in claim 7, wherein using a clear-to-send (CTS) protocol to clear a channel for transmission of a beacon message from the first wireless station comprises the first wireless station transmitting a clear to send to self (CTS2SELF) message to clear the channel.

9. A first wireless station as recited in claim 1, wherein the processor is configured to initiate a beacon protection technique in response to a beacon collision, wherein the beacon protection technique includes imposing a guard interval immediately prior to beacon messages transmitted by the first wireless station.

10. A wireless access point (AP) comprising:
a plurality of antennas; and
a radio frequency (RF) subsystem coupled to the plurality of antennas, the RF subsystem including an RF transceiver and a processor coupled to the RF transceiver, the processor configured to cause the wireless AP to establish an association to at least one receiving wireless station over a wireless link in accordance with IEEE standard 802.11, the processor further configured to cause the wireless AP to:
transmit beacon messages in accordance with IEEE standard 802.11, for receipt by the at least one receiving wireless station, according to a first beacon interval, the beacon messages including a first message;
receive a second message over the wireless link;
determine a second beacon interval that is different from the first beacon interval, based on information in the second message, by selecting the second beacon interval from among a plurality of predetermined interval values according to a randomization criterion;
transmit beacon messages in accordance with IEEE standard 802.11, for receipt by the at least one receiving wireless station, according to the second beacon interval; and
perform at least one of:
apply a particular one or more carrier sense multiple access with collision detection (CSMA/CD) backoff parameters only to beacon messages, for purposes of transmitting beacon messages from the first wireless station; or
overrule CSMA/CD for purposes of transmitting beacon messages from the first wireless station.

11. A wireless AP as recited in claim 10, wherein the processor is configured to determine the second beacon interval by:
identifying a third beacon interval associated with beacon messages being transmitted by another wireless AP; and
determining the second beacon interval based on the third beacon interval.

12. A wireless AP as recited in claim 11, wherein determining the second beacon interval based on the third beacon interval comprises selecting the second beacon interval to be different from the third beacon interval.

13. A wireless AP as recited in claim 10, wherein the processor is configured to determine the second beacon interval based on a predetermined criterion designed to reduce a likelihood that beacon messages from the wireless AP will temporally overlap beacon messages from another receiving wireless station that is within a communications range of said at least one receiving wireless station.

14. A wireless AP as recited in claim 10, wherein the processor is configured to determine the second beacon interval according to a predetermined numerical sequence.

15. A wireless AP as recited in claim 10, wherein the second message comprises an indication of a third beacon interval associated with beacon messages from a wireless station other than the wireless AP, and wherein the processor is configured to determine the second beacon interval based on the indication.

16. A wireless AP as recited in claim 15, wherein the second message is a beacon message from said wireless station other than the wireless AP.

17. A wireless AP as recited in claim 15, wherein the second message is not a beacon message.

18. A wireless AP as recited in claim 10, wherein the information in the second message comprises an indication of a presence of at least one receiving wireless AP, and wherein the processor is configured to determine the second beacon interval based on the indication.

19. A wireless AP as recited in claim 18, wherein the indication comprises an indication of a beacon interval of said at least one receiving wireless AP.

20. A wireless AP as recited in claim 10, wherein the information in the second message comprises an indication of a type or types of receiving wireless station or stations associated to the wireless AP, and wherein the processor is configured to determine the second beacon interval based on the indication.

21. A wireless AP as recited in claim 10, wherein the information in the second message comprises an indication of a capability of at least one receiving wireless station associated to the wireless AP, and wherein the processor is configured to determine the second beacon interval based on the indication.

22. A wireless AP as recited in claim 10, wherein the processor is further configured to inform the at least one receiving wireless station of the second beacon interval by:
generating a beacon frame that includes an extended beacon interval field containing an indication of the second beacon interval, the extended beacon interval field including a standard beacon interval field portion and an extended beacon interval field portion; and
transmitting, by the wireless station, the beacon frame including the extended interval field.

23. A wireless AP as recited in claim 10, wherein the processor is further configured to cause the wireless AP to transmit a message to a second wireless station to request that the second wireless station scan for beacon messages from other receiving wireless stations.

24. A wireless AP as recited in claim 10, wherein the processor is configured to initiate a beacon protection technique in response to a beacon collision, wherein the beacon protection technique includes imposing a guard interval immediately prior to beacon messages transmitted by the wireless AP.

25. A method comprising:
transmitting, by a first wireless station, beacon messages wirelessly for receipt by at least one receiving wireless station, according to a first beacon interval, the beacon messages including a first message;
receiving, by the first wireless station, a second message from a second wireless station over a wireless link;
determining, by the first wireless station, a second beacon interval that is different from the first beacon interval, based on information in the second message, by selecting the second beacon interval from among a plurality of different predetermined interval values according to a randomization criterion;
transmitting, by the first wireless station, beacon messages for receipt by the at least one receiving wireless station, according to the second beacon interval; and
performing at least one of:
applying a particular one or more carrier sense multiple access with collision detection (CSMA/CD) back-off parameters only to beacon messages, for purposes of transmitting beacon messages from the first wireless station; or
overruling CSMA/CD for purposes of transmitting beacon messages from the first wireless station.

26. A method as recited in claim 25, wherein the processor is configured to determine the second beacon interval by:
identifying a third beacon interval associated with beacon messages being transmitted by another wireless station; and
selecting the second beacon interval to be different from the third beacon interval.

27. A method as recited in claim 25, wherein said determining the second beacon interval is based on a predetermined criterion designed to reduce a likelihood that beacon messages from the first wireless station will temporally overlap beacon messages from another wireless station that is within a communications range of said at least one receiving wireless station.

28. A method as recited in claim 25, wherein the second message comprises an indication of a third beacon interval associated with beacon messages from a wireless station other than the first wireless station, and wherein said determining the second beacon interval is based on the indication.

29. A method as recited in claim 28, wherein the second message is a beacon message from the second wireless station.

30. A method as recited in claim 28, wherein the second message is not a beacon message.

31. A method as recited in claim 25, wherein the first wireless station is a wireless access point (AP), the second wireless station is a non-AP wireless station, the information in the second message comprises an indication of a presence of at least one receiving wireless AP, and wherein said determining the second beacon interval is based on the indication.

32. A method as recited in claim 31, wherein the indication comprises an indication of a beacon interval of said at least one receiving wireless AP.

33. A method as recited in claim 25, wherein the information in the second message comprises at least one of:
an indication of a type or types of other receiving wireless station or stations associated to the first wireless station;
an indication of a capability of at least one receiving wireless station associated to the first wireless station; or
an indication of another receiving wireless station having difficulty in receiving beacon messages from multiple sources;
and wherein said determining the second beacon interval is based on the indication.

34. A method as recited in claim 25, further comprising informing the at least one receiving wireless station of the second beacon interval by:
generating a beacon frame that includes an extended beacon interval field containing an indication of the second beacon interval, the extended beacon interval field including a standard beacon interval field portion and an extended beacon interval field portion; and
transmitting, by the first wireless station, the beacon frame including the extended interval field.

35. A method as recited in claim 25, further comprising:
initiating a beacon protection technique in response to a beacon collision, wherein the beacon protection technique includes imposing a guard interval immediately prior to beacon messages transmitted by the first wireless station.

* * * * *